United States Patent [19]
Harper, Jr.

[11] Patent Number: 4,624,726
[45] Date of Patent: Nov. 25, 1986

[54] APPARATUS FOR FORMING ELONGATE STRUCTURES OF COMPOSITE MATERIALS

[75] Inventor: Jack E. Harper, Jr., Carrollton, Tex.

[73] Assignee: LTV Aerospace and Defense Company, Dallas, Tex.

[21] Appl. No.: 741,760

[22] Filed: Jun. 6, 1985

[51] Int. Cl.⁴ .......................................... B65H 20/16
[52] U.S. Cl. .................. 156/323; 156/433; 226/173; 425/122; 425/363; 264/322; 264/271.1; 264/347
[58] Field of Search .................. 425/384, 122, 363; 226/166, 173; 156/323; 264/322, 271.1, 347

[56] References Cited

U.S. PATENT DOCUMENTS

| | | | |
|---|---|---|---|
| 1,545,349 | 7/1925 | Riedel | 226/173 |
| 2,496,911 | 2/1950 | Green | 156/323 |
| 2,528,168 | 10/1950 | Paulsen | 156/323 |
| 3,076,367 | 2/1963 | Leibinger et al. | 226/166 |
| 3,151,354 | 10/1964 | Boggs | 226/173 |
| 3,256,558 | 6/1966 | Andersen et al. | 226/173 |
| 3,562,059 | 2/1971 | Gladen | 156/323 |
| 3,767,500 | 10/1973 | Tally et al. | 156/323 |
| 3,841,407 | 10/1974 | Bozeman | 226/173 |
| 4,306,856 | 12/1981 | Arippol | 425/384 |
| 4,494,344 | 1/1985 | Petcen | 156/323 |

FOREIGN PATENT DOCUMENTS 1024421 7/1962 United Kingdom ............... 226/173

Primary Examiner—Tim Miles
Attorney, Agent, or Firm—James M. Cate; Charles S. Cotropia

[57] ABSTRACT

An apparatus is disclosed for forming elongate structures of composite materials. The apparatus includes a plurality of forming dies for preheating, heating and then cooling an elongate portion of composite material while shaping the material within an internal passage. A pulling device is utilized to continuously draw elongate strips of composite material through the forming dies. The pulling device includes two opposed endless track devices. One of the endless track devices serves to mount a plurality of engagement dogs, each having a substantially flat surface for engagement of the elongate portion of composite material. The other endless track device serves to mount a plurality of pivoting engagement dogs, each having a curvilinear surface wherein increased resistance by said elongate strip of composite material will pivot the curved surface into closer alignment with a corresponding flat surface, thereby tightening the grip of the pulling device on the elongate strip of composite material.

18 Claims, 2 Drawing Figures

APPARATUS FOR FORMING ELONGATE STRUCTURES OF COMPOSITE MATERIALS

BACKGROUND OF THE INVENTION

This invention relates in general to a device for constructing elongate structures of composite materials, such as graphite/epoxy tape and in particular to devices for pulling elongate structures through a plurality of forming dies. Still more particularly, the present invention relates to such devices which include gripping means which tightens in response to increased resistance.

Devices for forming composite structures are well known in the prior art. Many such devices include one or more forming dies for forming and curing strips of epoxy coated graphite materials. It is necessary to draw the cured material through the dies utilizing a mechanical drawing device when an elongate structure is desired.

A problem exists when attempting to form elongate structures of great length in that mechanical drawing devices capable of pulling such structures through the forming dies are unduly complex and unreliable.

One solution to this problem of fabricating elongate structures is the utilization of continuous pulling devices which are capable of drawing structures of indeterminate length through forming dies. However, the utilization of such devices often generates problems when the grip of the device on the elongate composite structure is either too loose, resulting in slippage and uneven curing of the resultant structure, or is too tight, resulting in damage to the resultant structure.

It is therefore obvious that a need exists for a continuous pulling device which is capable of positively gripping an elongate composite structure and increasing the tightness of that grip in response to increased resistance of the elongate composite structure.

SUMMARY OF THE INVENTION

It is therefore one object of the present invention to provide an improved device for forming elongate structures of composite materials.

It is another object of the present invention to provide an improved device for forming elongate structures of composite material which includes a continuous pulling device for pulling structures forming dies.

It is still another object of the present invention to provide an improved device for forming elongate structures of composite materials which includes a pulling device capable of adjusting the tightness of its grip in response to increased resistance of the elongate strip through the pulling dies.

The foregoing objects are achieved as is now described. The apparatus of the present invention includes a plurality of forming dies for preheating, heating and then cooling an elongate portion of composite material while shaping the material within an internal passage. A pulling device is utilized to continuously draw elongate strips of composite material through the forming dies. The pulling device includes two opposed endless track devices. One of the endless track devices serves to mount a plurality of engagement dogs, each having a substantially flat surface for engagement of the elongate portion of composite material. The other endless track device serves to mount a plurality of pivoting engagement dogs, each having a curvilinear surface wherein increased resistance by said elongate strip of composite material will pivot the curved surface into closer alignment with a corresponding flat surface, thereby tightening the grip of the pulling device on the elongate strip of composite material.

BRIEF DESCRIPTION OF THE DRAWINGS

The novel features believed characteristics of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1, 2:
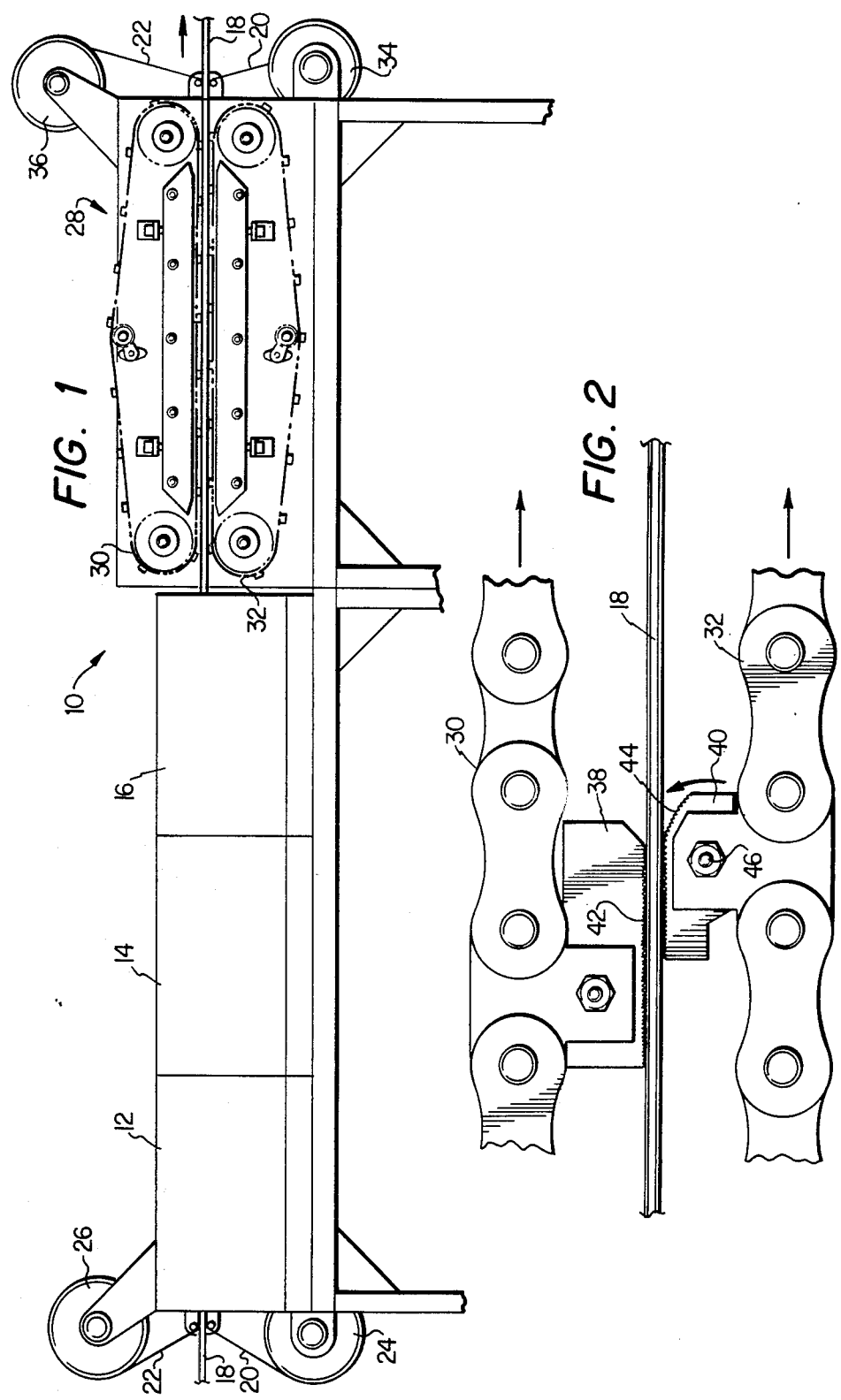
FIG. 1 depicts a side view of the novel apparatus for forming elongate structures of composite materials of the present invention.
FIG. 2 depicts an enlarged view of the engagement dogs of the continuous pulling device depicted in FIG. 1.

With reference now to the figures and in particular with reference to FIG. 1, there is depicted a side view of apparatus 10 of the present invention. As can be seen, apparatus 10 includes a plurality of forming dies 12, 14 and 16. In the depicted embodiment of the present invention, forming die 12 is preferably a pre-heating die, forming die 14 is preferably a heating die and forming die 16 is a cooling die. Those skilled in the art will appreciate that a greater or lesser number of dies may be utilized, as is desired. Each forming die 12, 14 and 16 includes a longitudinal passage through which an elongate portion of uncured composite material 18 may be passed. Of course, each longitudinal passage must be aligned so that composite material 18 may pass through a plurality of such forming dies.

As depicted, an elongate portion of uncured composite material 18 is then inserted into forming die 12 between two elongate strips of fabric slip tape 20 and 22. Fabric slip tape strips 20 and 22 are preferably stored on reels 24 and 26 and are comprised of a Teflon TM coated Fiberglas TM tape such as Armolon TM tape, manufactured by Chemfab, Materials Technology Division, of West Bennington, Vermont.

Uncured composite material 18 is then preferably drawn through forming dies 12, 14 and 16 by continuous pulling device 28. Continuous pulling device 28, as depicted, includes two opposed endless track devices 30 and 32 which are driven through appropriate gearing by an electric motor (not shown). As should be apparent, continuous pulling device 28 may be utilized to pull fabric slip tape strips 20 and 22 through forming dies 12, 14 and 16 as elongate composite material 18 is being fed through forming dies 12, 14 and 16, thus facilitating insertion of elongate composite material 18 through forming dies 12, 14 and 16.

Of course those skilled in the art will appreciate that the speed at which uncured composite material 18 is drawn through forming dies 12, 14 and 16 will determine the degree of curing imparted to composite material 18. In the depicted embodiment, composite material 18 is preferably cured to the so-called "B stage" cure.

Finally, reels 34 and 36 are utilized to receive the strips of fabric slip tape 20 and 22 respectively. In this manner, fabric slip tapes 20 and 22 may be utilized not only to aid in the insertion of composite material 18 but also to protect composite material 18 as it passes through forming dies 12, 14 and 16 and throughout the passage of composite material 18 through continuous pulling devices 28.

With reference now to FIG. 2, there is depicted an enlarged view of engagement dogs 38 and 40, which are mounted to endless track devices 30 and 32 respectively. In a preferred embodiment of the present invention, each endless track device serves to mount a plurality of engagement dogs identical to engagement dogs 38 and 40. An important feature of the present invention is the shape of engagement dogs 38 and 40 and the method by which each engagement dog is mounted to its respective endless track device.

As may be seen, engagement dog 38 includes a substantially flat surface 42 which may include knurls along the surface thereof. Engagement dog 40 includes a curvilinear surface 44 which may also be knurled and which has a radius from the axis of shaft 46 which increases in the direction of movement of the composite material 18 when dog 40 engages the material 18. Engagement dog 40 is also preferably rotatably mounted on shaft 46. In this manner, increased resistance of composite material 18 through forming dies 12, 14 and 16 will cause engagement dog 40 to rotate in a counter-clockwise manner, as indicated by the arrow in FIG. 2. Such rotation causes curvilinear surface 44 to rotate into closer contact with flat surface 42, thereby tightening the grip of engagement dogs 38 and 40 on composite material 18. Thus, composite material 18 may be smoothly drawn through the forming dies with each increase in resistance resulting in an automatic tightening of engagement dogs 38 and 40, ultimately resulting in a smoother transit of composite material 18 and a more uniform state of cure.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An apparatus for forming elongate structures composed of composite materials comprising:
   a plurality of forming dies for forming and curing an elongate portion of composite material, each of said plurality of forming dies having a shaping passage therein, each of said shaping passages being longitudinally aligned; and
   puller means adapted to engage said formed and cured elongate portion of composite material and pull said portion of composite material through said plurality of forming dies, said puller means including :
   a pair of endless track devices, the composite material passing between the track devices, each endless track device having an endless track for traveling along a path, a portion of the endless track path of each endless track device being disposed adjacent and parallel to the elongate direction of the composite material;
   means for driving the endless track on each device so that the parallel portions travel in the same direction and at the same speed;
   at least one first engagement dog mounted to a first of said endless tracks, said first engagement dog having a substantially flat surface adapted to engage one surface of said formed and cured elongate portion of composite material; and
   at least one second engagement dog pivotally mounted to a second of said endless tracks, said second engagement dog having a curvilinear surface which increases in radius in the direction of movement of the composite material, said curvilinear surface adapted to engage a second surface of said formed and cured elongate portion of composite material, the first and second engagement dogs being paired, the surface of the associated pair facing each other during the portion of the paths of the endless tracks adjacent and parallel to the composite material, said second engagement dog pivoting so that the radius between the pivot axis and the portion of the curvilinear surface contacting the second surface of the formed and cured elongate portion of composite material increases as the resistance to movement of the composite material through the dies increases to more firmly engage the formed and cured elongate portion of cmposite material between the facing surfaces of the dogs, the length of the flat surface on the first engagement dog being sufficiently long in the direction of movement of the composite material so that the composite material is continuously supported by the flat surface normal to the point of application of the force exerted by the curvilinear surface on the second surface of said formed and cured elongate portion of composite material.

2. The apparatus for forming elongate structures composed of composite materials according to claim 1 wherein said plurality of forming dies includes a preheating forming die.

3. The apparatus for forming elongate structures composed of composite materials according to claim 1 wherein said plurality of forming dies includes a heating die.

4. The apparatus for forming elongate structures composed of composite materials according to claim 1 wherein said plurality of forming dies includes a cooling die.

5. The apparatus for forming elongate structures composed of composite materials according to claim 1 further including means for feeding an elongate fabric tape through said plurality of forming dies in an overlying relationship with said elongate portion of composite material.

6. The apparatus for forming elongate structures composed of composite materials according to claim 5 further including means disposed adjacent to said puller means for receiving said elongate fabric tape.

7. The apparatus for forming elongate structures composed of composite materials according to claim 5 wherein said means for feeding an elongate fabric tape through said plurality of forming dies in an overlying relationship with said elongate portion of composite material also includes means for feeding a second elongate fabric tape through said plurality of forming dies in an underlying relationship with said elongate portion of composite material.

8. The apparatus for forming elongate structures composed of composite materials according to claim 5 wherein said elongate fabric tape comprises Teflon TM coated Fiberglas TM tape.

9. An apparatus for forming elongate structures composed of composite materials comprising:
- a plurality of forming dies for forming and curing an elongate portion of composite material, each of said plurality of forming dies having a shaping passage therein, each of said shaping passages being longitudinally aligned; and
- puller means adapted to engage said formed and cured portion of composite material and pull said portion of said composite material through said plurality of forming dies, said puller means comprising:
- a pair of endless track devices, each endless track device supporting an endless track for continuous movement along a path, a portion of the path of the endless track on a first of the endless track devices lying parallel to one surface of said formed and cured elongate portion of composite material and spaced a constant distance from said one surface, a portion of the path of the endless track on a second endless track device being parallel to and spaced a constant distance from a second surface of said formed and cured elongate portion of composite material, the path portions extending along the direction of movement of the composite material in facing relationship;
- means for simultaneously moving said endless tracks along their paths of motion so that movement along the path portions is in the same direction at the same speed;
- a first plurality of engagement dogs mounted to a first of said endless tracks, each of said first plurality of engagement dogs having a substantially flat surface adapted to engage said one surface of said formed and cured elongate portion of composite material during the portion of the path of the first endless track parallel the composite material; and
- a second plurality of engagement dogs pivotally mounted to a second of said endless tracks, each of said second plurality of said engagement dogs having a curvilinear surface increasing in radius from the pivot axis in the direction of movement of the composite material, said curvilinear surfaces thereon adapted to engage the second surface of said formed and cured elongate portion of composite material during the portion of the path of the second endless track parallel the composite material, each of said first engagement dogs being paired with a second engagement dog, said formed and cured elongate portion of composite material being engaged between pairs of said first and second engagement dogs along the portions of the endless track paths, each of said second plurality of engagement dogs being pivotally mounted such that an iincrease in the resistance of said formed and cured elongate portion of composite material of movement through said puller means pivots each of said second plurality of engagement dogs engaged with the composite material wherein each of said curvilinear surfaces shall move closer to each of said flat surfaces of said first plurality of engagement dogs engaging the composite material to more firmly engage said formed and cured elongate portion of composite material, the flat surface of each first engagement dog being sufficiently long in the direction of movement of the composite material so that the portion of each curvilinear surface engaging the composite material is supported by a portion of the flat surface directly opposite throughout the entire pivotal range of motion of the plurality of second engagement dogs corresponding to the variation of engagement force on the composite material.

10. The apparatus for forming elongate structures composed of composite materials according to claim 9 wherein said plurality of forming dies includes a preheating forming die.

11. The apparatus for forming elongate structures composed of composite materials according to claim 9 wherein said plurality of forming dies includes a heating die.

12. The apparatus for forming elongate structures composed of composite materials according to claim 9 wherein said plurality of forming dies includes a cooling die.

13. The apparatus for forming elongate structures composed of composite materials according to claim 9 further including means for feeding an elongate fabric tape through said plurality of forming dies in an overlying relationship with said elongate portion of composite material.

14. The apparatus for forming elongate structures composed of composite materials according to claim 13 further including means disposed adjacent to said puller means for receiving said elongate fabric tape.

15. The apparatus for forming elongate structures composed of composite materials according to claim 13 wherein said means for feeding an elongate fabric tape through said plurality of forming dies in an overlying relationship with said elongate portion of composite material also includes means for feeding a second elongate fabric tape through said plurality of forming dies in an underlying relationship with said elongate portion of composite material.

16. The apparatus for forming elongate structures composed of composite materials according to claim 13 wherein said elongate fabric tape comprises Teflon TM coated Fiberglas TM tape.

17. The apparatus for forming elongate structures composed of composite materials according to claim 13 wherein each of said curvilinear surfaces is knurled to enhance gripping.

18. The apparatus for forming elongate structures composed of composite materials according to claim 13 wherein each of said substantially flat surfaces is knurled to enhance gripping.

* * * * *